United States Patent
Kuchhal

(10) Patent No.: US 9,823,914 B2
(45) Date of Patent: Nov. 21, 2017

(54) WEB APPLICATIONS HAVING END-USER DATA ISOLATED IN THE LOCAL DOMAIN

(75) Inventor: Manu Kuchhal, Gurgaon (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1380 days.

(21) Appl. No.: 13/338,938

(22) Filed: Dec. 28, 2011

(65) Prior Publication Data
US 2013/0173684 A1    Jul. 4, 2013

(51) Int. Cl.
G06F 15/16    (2006.01)
G06F 9/445    (2006.01)
G06F 17/30    (2006.01)

(52) U.S. Cl.
CPC ........ G06F 8/60 (2013.01); G06F 17/30864 (2013.01)

(58) Field of Classification Search
CPC .......................................... G06F 8/60
USPC ....................................... 709/201
See application file for complete search history.

(56) References Cited

U.S. PATENT DOCUMENTS

| | | | |
|---|---|---|---|
| 2003/0229900 A1* | 12/2003 | Reisman | G06F 17/30873 725/87 |
| 2009/0024632 A1 | 1/2009 | Dheap et al. | |
| 2010/0198730 A1 | 8/2010 | Ahmed et al. | |
| 2010/0242018 A1* | 9/2010 | Balfe | G06F 8/20 717/118 |
| 2011/0022642 A1 | 1/2011 | Demilo et al. | |
| 2011/0087690 A1 | 4/2011 | Cairns | |
| 2011/0126168 A1 | 5/2011 | Ilyayev | |
| 2011/0138059 A1* | 6/2011 | Schleifer et al. | 709/227 |
| 2011/0252303 A1* | 10/2011 | Lemonik | G06F 17/218 715/234 |

OTHER PUBLICATIONS

Dalling, Tom; Model View Controller Explained; May 31, 2009; Available online at: www.tomdalling.com/blog/software-design/model-view-controller-explained/.*
"Unhosted Web Applications: A New Approach to Freeing SAAS", Nathan Willis, Jan. 26, 2011, The Unhosted Approach, p. 1, http://lwn.net/Articles/424822/.
"Enhance the User Data Privacy for SAAS by Separation of Data", Zhang Quiang Cui Dong, ICIII '09 Proceedings of the 2009 International Conference on Information Management, Innovation Management and Industrial Engineering—vol. 03 IEEE Computer Society Washington, DC, USA 2009.

* cited by examiner

Primary Examiner — David Lazaro
Assistant Examiner — Xiang Yu
(74) Attorney, Agent, or Firm — Cuenot, Forsythe & Kim, LLC

(57) ABSTRACT

A session for a Web application can be established between a Web server of a Web domain and a browser of a client of a local domain. The Web application can be constructed so that view and controller functionality are provided by components executing in the Web domain and where model functionality is provided by components executing in the local domain. During the session, an expeditor runtime component can be served from the Web domain to the local domain for the Web application session. At least one widget can be served from the Web domain to the local domain, where the widgets execute within an instance of the expeditor runtime. End-user data utilized by the Web application can be isolated within the local domain so that it is not exposed to the Web domain.

8 Claims, 3 Drawing Sheets

WEB APPLICATIONS HAVING END-USER DATA ISOLATED IN THE LOCAL DOMAIN

BACKGROUND

The present invention relates to the field of Web applications and, more particularly, to Web applications having end-user data isolated in the local domain.

Software As A Service (SaaS) can permit rich internet applications (RIA) to be easily delivered providing vast array of capabilities within a networked environment. For example, SaaS can allow applications to be deployed to a desktop environment (e.g., within a Web browser) and accessed over the Web without installation overhead. SaaS is often employed to allow reducing overhead and minimize maintenance of locally installed applications on client devices (e.g., desktop computers). The adoption of SaaS, however, has been marred by the concerns of data privacy and confidentiality. In a typical SaaS based application (e.g., online PDF editors), users are required to upload their data to the server side to perform actions (e.g., data conversion).

For example, in a typical SaaS based application, users are required to upload their data to the Web domain (or cloud). This is something not acceptable or at least disfavored by a large number of users/companies, who wish (or must) to maintain control over their data. For this reason, many users/companies maintain an IT infrastructure, where locally installed applications must be purchased and/or maintained. In absence of the data control issues, many of these users/companies would happily take advantage of SaaS benefits and forego troubles and costs of locally installed/maintained applications.

BRIEF SUMMARY

One embodiment of the disclosure provides a system, method, apparatus, and/or computer program product for implementing a Web application without exposing end-user data to a Web domain. In the embodiment, a session for a Web application can be established between a Web server of a Web domain and a browser of a client of a local domain. The Web application can be constructed so that view and controller functionality are provided by components executing in the Web domain and where model functionality is provided by components executing in the local domain. During the session, an expeditor runtime component can be served from the Web domain to the local domain for the Web application session. The expeditor runtime component can provide the model functions of the Web application. The expeditor runtime component can be dynamically deployed, installed, and run without rebooting software of the client. The expeditor runtime can be an extension of the browser. During the session, at least one widget can be served from the Web domain to the local domain. The widget can execute within an instance of the expeditor runtime. The session can then be conducted. In the session, user interface functionality for user interfaces rendered within the browser is provided by the Web server. Control of the Web application can be maintained by the Web server. End-user data utilized by the Web application can be isolated within the local domain so that it is not exposed to the Web domain. Model functions of the expeditor runtime running in the local domain handle processing of the end-user data.

DETAILED DESCRIPTION

Figure 1:
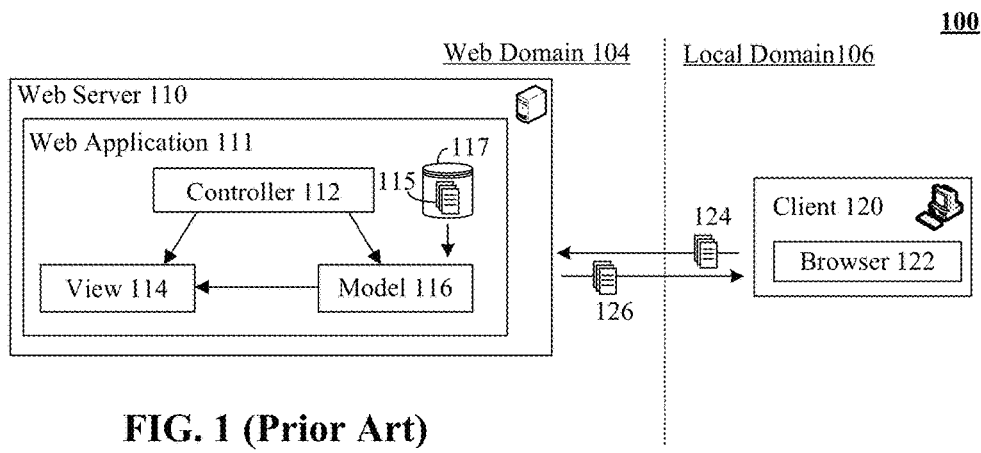
FIG. 1 (Prior Art) shows a conventionally implemented system for Web applications.

FIG. 1 (Prior Art) shows a conventionally implemented system 100 for Web applications. System 100 has a Web domain 104 including one or more Web servers 110 and a local domain 106 including a client 120 device, which utilizes a browser 122 (or equivalent, such as a rich internet application) to interact with the Web server 110 over a network connecting the two domains 104, 106. Requests 124 and data are conveyed over this network from the client 120, and browser 122 renderable content 126 is provided by the Web server 110. That is, the Web server 110 provides a Web application 111 that runs within the browser 122. These Web applications 110 include model 116, view 114 and controller 112 functionality. End user data 115 used by the Web application 111 is maintained in a data store 117 in the Web domain 104.

In FIG. 1, the model 116 refers to a component/functionality that manages behavior of data, that responds to request for information about state (usually from the view 114), responds to instructions to change state (usually from the controller 112), and that notifies observers (usually views) when changes occur so reactions to data changes are possible. The view 114 refers to a component/functionality for machine-to-human interactions, which refers to providing user interface elements of the Web application 111. The controller 112 refers to a component/functionality that receives, processes, and reacts to user input. That is, the controller 112 accepts input from a user and instructs model and viewports to perform actions based on the input. The model 116, view 114, and controller 112 functionality of a Web application 111 may be written in accordance with an architecture that isolates these functions from each other (e.g., a MVC architecture) or may simply provide the detailed functionality in a more integrated (non-isolated) manner. Either way, the end-user data 115 consumed by the Web application 111 is needed in the Web domain 104. Further, regardless of whether end-user data 115 is persisted in the Web domain 104 or is only maintained in a temporary memory, confidentiality of the end-user data 115 is potentially compromised by virtual of its accessibility form the Web domain 104.

The present disclosure provides a solution for providing Web applications, where end-user data is isolated in the local domain. That is, Web application components for a user interface (e.g., view components) and for application functions (controller components) are provided by a Web server operating in a Web domain, while model components/functionality and end-user data is provided by one or more devices executing in a local domain. Thus, the disclosure provides all the features/benefits of a SaaS based application deployment, while ensuring end-user data is kept private and confidential.

In one embodiment, the disclosure uses an expeditor runtime component, which can be an open services gateway initiative (OSGI) framework component that executes in the local domain. A bridge (i.e., a java or Java script bridge for example) can be established between a client-side Web browser and the expeditor runtime. The bridge exposes functionality of the expeditor runtime (e.g., model functionality) to a Web application, which is rendered within the Web browser. Accordingly, view and controller functionally can be provided by computing resources (e.g., a Web server) running in the Web domain, while model functionality is provided by resources (e.g., a client device upon which the Web browser executes) running in the local domain. End-user data that is updated, created by, and otherwise manipulated by the Web application is exposed only to the expeditor runtime, and is never accessible from the Web domain. Thus, the end-user data is isolated from the Web domain, while the Web domain is used to provide interface and functional components of the Web application.

Additionally, the expeditor runtime is able to execute model-based components, served from a web server or network server of a Web domain for a user-session. These components are dynamically deployed, installed, and run. The disclosed architecture is extensible, as new components (for the expeditor runtime that runs in the local domain) can be created and added at will. Each web application need not have its own web-browser plug-in, but each can utilize one or more expeditor runtime components, which can in turn be used by multiple different applications. Further, the expeditor runtime itself can be a deployable, installable, and runnable packet/bundle able to be dynamically deployed on client-side machines. In embodiments of the disclosure, only one browser extension is needed (the expeditor runtime infrastructure extension) and application-specific logic can be built as plug-ins, widgets, or other components that are deployable to the local domain and that execute in the expeditor runtime. Consequently, the disclosure provides an extensible framework able to run many different kinds of applications, which leverage concepts of modularization and component re-use, and that isolates end-user data to the local domain while providing web application user interfaces and core functions from the Web domain.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
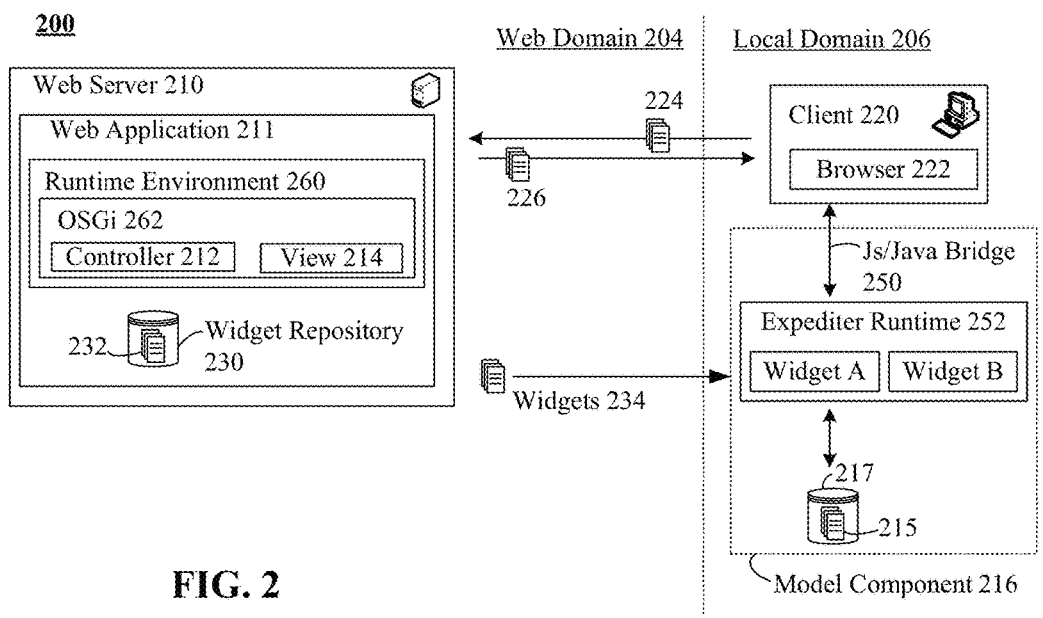
FIG. 2 shows a diagram of a system for providing a Web application having end-user data isolated form the Web domain in accordance with an embodiment of the disclosure.

FIG. 2 shows a diagram of a system 200 for providing a Web application having end-user data isolated form the Web domain in accordance with an embodiment of the disclosure. System 200 shows a Web server 210 in a Web domain 204. A client 220, an expeditor runtime component 252, and a data store 217 for end-user data 215 can run in a local domain 206. In one embodiment, the expeditor runtime component 252 can execute within the client device 220 and the data store 217 can be disposed in the client device 220. Embodiments are contemplated, however, where the expeditor runtime 252 executes in a different physical device from client 220 and/or where the data store 217 is located within the local domain 206 in hardware distinct from that of the client 220. Bridge 250 (e.g., which can be a JAVA SCRIPT/JAVA one) can expose functionality of the expeditor runtime 252 (e.g., model functionality) to a Web application 211, which is rendered within the Web browser 222.

The Web server 210 can serve the Web application 211 from the Web domain 204 to many different remotely located client devices, such as client 220. For example, Hypertext Transfer Protocol (HTTP) (secure or otherwise) requests from a browser 222 can be directed to the Web server 210, which provides browser render-able content in response to the requests. Controller 212 and view 214 functionality of the Web application 211 can be provided within the Web domain 204, while model 216 functionality is provided by the local domain 206.

Web application 221 can include a runtime environment 260 (e.g., a JAVA based one) having open service gateway initiative (OSGi) framework components 262. In one embodiment, OSGi components can include components conforming to version 4.3 OSGi specification defined by the OSGi Alliance. Other versions and derivatives of the OSGi specification are contemplated herein for the OSGi components 262. Further, components 262 can be implemented using other standards that provide for a dynamic component model for the Web application 211, where application components are able to be remotely installed, started, stopped, and updated without requiring a reboot of the client 220. For example, the components 262 can provide an environment for the modularization of application 211 into smaller bundles. Each bundle can be a tightly-coupled, dynamically loadable collection of classes, jars, and configuration files that explicitly declare their external dependencies (if any).

The Web application 211 can utilize a set of widgets 232 maintained in widget repository 230. These widgets 234 can be provided to the local domain 206 as needed. The expeditor runtime 252 can be designed to run code of the widgets 234 it receives.

It should be appreciated that use of the bridge 250 and the expeditor runtime 252 permits the model component 216 (and end-user data 215 consumed by the model component) of the Web application 211 to reside within the local domain 206. The expeditor runtime 252 can be a lightweight one able to be dynamically deployed, installed, and executed during a session, without reboot, as needed. Similarly, the widgets 234 can be dynamically deployed, installed, and executed during the session. The framework of system 200 is extensible, as any variety of new widgets 234 can be added for additional functionality. Further, the framework is applicable to any Web application 211 or software service that is able to be written to isolate its model functionality (provided via local domain 206) from its controller and view functionality.

Figure 3:
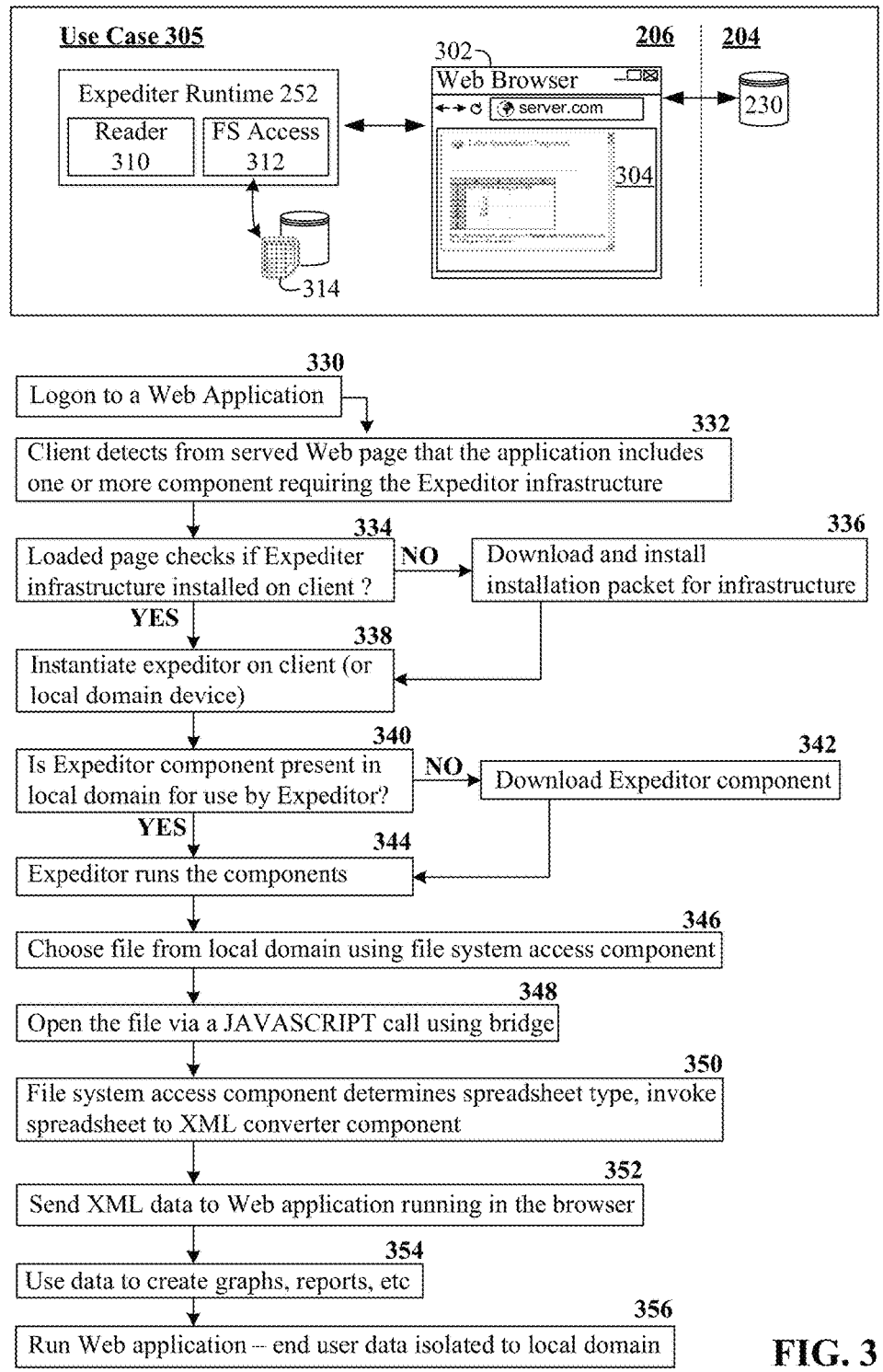
FIG. 3 provides a use case for a Web application having end-user data isolated form the Web domain in accordance with an embodiment of the disclosure.

To elaborate, FIG. 3 provides a use case for a Web application having end-user data isolated form the Web domain in accordance with an embodiment of the disclosure. In the use case, a spreadsheet viewer application (spreadsheet interface 304 is shown within a Web browser interface 302) deployed using a Software as a Service (SaaS) paradigm, where the end-user data (e.g., local spreadsheet file 314) is isolated in the local domain 206. The use case diagram 305 also shows widget repository 230 and runtime expeditor 252. In diagram 305, expeditor 252 can execute a spreadsheet reader plugin 310 and a persistence layer (for file system access) component 312 for local file system access.

In the use case, a user, from the browser interface 302, can log onto a Web application, as shown by step 330. The login to the Web application can be performed in a "standard" or typical manner. In step 332, the client can detect from served Web page (or from any content served from the Web domain 206) that the Web application includes one or more components (e.g., component 310 and 312) requiring the expeditor 252 infrastructure.

In step 334, the loaded page (or other code conveyed from the Web domain 204 that is being executed by the browser) can check if the expeditor infrastructure is installed on the client (or other device linked to the client executing in the local domain 206). If not, step 336 can execute where a package or set of bundles for the expeditor infrastructure can be downloaded and installed in client (or other device linked to the client executing in the local domain 206). In step 338, the expeditor infrastructure can be instantiated (nm) on the client.

In step 340, the client can check whether the expeditor components needed for the Web application are present in the local domain 206 for use by the expeditor 252. If not, these components (e.g., components 310 and 312 in the use case) can be downloaded to the local domain 206 from the widget repository 230 of the Web domain 204, as shown by step 342. In step 344, the expeditor can run the infrastructure components. The life cycle of these components 310, 312 can be limited to the user session in one embodiment. In another, if a user explicitly wants to (or if a configuration setting of the client 220 or Web browser so dictates) the components 310, 312 can be persisted for the next session. Even when persisted, the components 310, 314 may be activated only when a fresh session id from a fresh user login is passed to the expeditor runtime 252.

Using the file system access component 312, a user can choose a file (e.g., file 314) from the local desktop (or other data store of the local domain 206), as shown by step 346. Selection of the spreadsheet file 314, can result in a JAVASCRIPT call to open the file, which gets transmitted to the file system access component 312, via the bridge 250, as shown by step 348. In step 350, a file system access component 312 can be determined that the file is a spreadsheet type of file. It can invoke a spreadsheet to XML converter component to convert the file's data to a format able to be handled by the Web application. In step 352, data can be sent to the Web application (e.g., interface 304) running in the browser via the bridge 252. In one embodiment, this data can be XML formatted, and can be presented by the corresponding Web component (e.g., an iWidget component, for example) on the browser interface 222. In step 354, once the data is available in the Web application interface 304, it can be interactively used. For example, the spreadsheet data can be used to create views, like graphs, reports, and the like.

Referring to step 356, it should be observed that the data from file 314 never leaves the local domain 304 and never enters the Web domain 204, yet can be presented within a Web interface 302 (served from the Web domain 204) and can controlled by code conveyed from the Web domain 204 during the Web application session. It should be appreciated that the approach in the disclosure can be contrasted to a traditional SaaS approach, where a user must upload data from the file 314 to the Web domain 204 (e.g., Web server) before this information is able to be viewed, processed, and otherwise utilized by the Web application.

It should be appreciated that the use case, although presented in context of a spreadsheet, can be applied to any kind of SaaS application where it is possible to break the view/controller functionality from the model/data cleanly. Thus, the use case represents one of many contemplated situations to which the disclosed solution applies.

Figure 4:
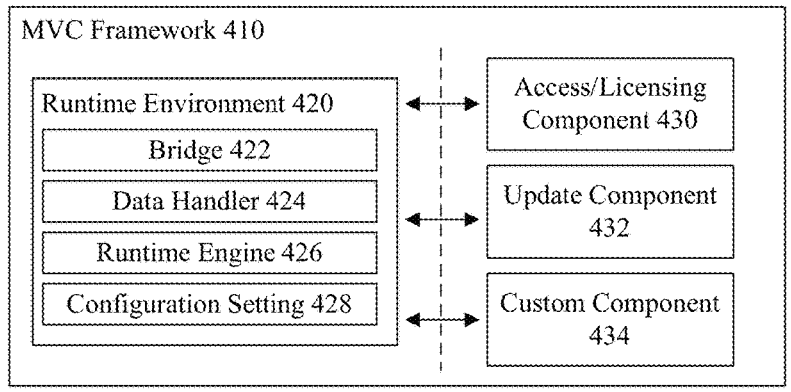
FIG. 4 is a diagram illustrating a model-view-controller (MVC) framework in accordance with an embodiment of the inventive arrangements disclosed herein.

FIG. 4 is a diagram illustrating a model-view-controller (MVC) framework 410 in accordance with an embodiment of the inventive arrangements disclosed herein. That is, the model portion of framework 410 can be provided by components of the local domain 206, while view and controller portions of framework 410 can be provided by components of a Web domain 204. Thus, MVC framework 410 can be present in the context of system 200, use case 305, as well as method 500.

It should be appreciated that the disclosure can utilize traditional design patterns to accomplish the capabilities described herein, even though specifics for the myriad of applicable design patterns are not specifically elaborated upon herein. Additionally, the framework 410 is shown for illustrative purposes only and the scope of the disclosure is not to be limited to its specifics. For instance, a bridge pattern can be employed to enable framework 410 to decouple model portions of a MVC application. That is, a bridge pattern can provide encapsulation, aggregation, and inheritance properties to separate component responsibilities into different classes which can be easily distributed within a client-server architecture.

MVC framework 410 can be a software framework for conveying an application (e.g., MVC application 462) functionality to a client device. Framework 410 can include, but is not limited to, runtime environment 420, access/licensing component 430, update component 432, custom component 434, and the like.

Framework 410 can include, but is not limited to, objects, classes, interfaces, and the like. For example, framework 410 can include a JAVA programming language interface. Framework 410 can be a distributed framework residing within server and client components. In one embodiment, the runtime environment 420 can be an execution environment within a client device. For instance, runtime environment 420 can be a portable client runtime which can be rapidly deployed and established within a client device in response to an application instance request. In one embodiment, the runtime embodiment 420 can utilize components conforming to OSGi standards, which are components of the environment 420 permitting application components to be remotely installed, started, stopped, and updated without requiring a reboot of the client. In the embodiment, components 430, 432, and 434 can be elements within a server operating in the web domain 206.

Runtime environment 420 can include, but is not limited to, bridge 422, data handler 424, runtime engine 426, configuration setting 428, and the like. Environment 420 functionality can include, but is not limited to, task scheduling, resource management, and the like. In one embodiment, environment 420 can be an IBM LOTUS EXPEDITOR runtime environment. In the embodiment, environment 420 can be utilized to deploy MVC application functionality, maintain MVC application, and/or update MVC application functionality.

Bridge 422 can be a software element permitting the generation of browser executable code linked to a MVC application. Bridge 422 functionality can include, but is not limited to, executable code generation, object passing, state tracking, and the like. For example, bridge 422 can permit browser executable code to pass objects to a locally executing MVC application functionality. In one instance, bridge 422 can be a JAVASCRIPT stub function generator for MVC application functionality. In the instance, JAVASCRIPT stubs can be utilized to receive user input which can trigger MVC application functionality. For example, a file chosen within a file selection dialog can be communicated to a locally executing MVC application functionality to enable the application functionality to process the file locally. In one embodiment, bridge 422 can be a functionality of plug-in of an expeditor component.

Data handler 424 can be a software component configured to manage user data within a client device. Handler 424 functionality can include, but is not limited to, data storage, data access, data serialization, and the like. Handler 424 can provide access to a model component of the MVC application. In one instance, handler 424 can permit domain logic within a model component to access user data securely. In one embodiment, handler 424 can be implemented within a persistence layer, which may utilize an expeditor component (e.g., component 312).

Runtime engine 426 can be a software entity permitting local functionality of a MVC application to be executed within a client device. Engine 426 functionality can include, but is not limited to, program code execution, type checking, bounds checking, error handling, optimization, and the like. In one embodiment, engine 426 can conform to an IBM LOTUS EXPEDITOR runtime environment. In the embodiment, engine 426 can include client services such as IBM LOTUS EXPEDITOR CLIENT FOR DESKTOP.

Configuration setting 428 can be one or more rulesets for establishing the behavior of environment 420 and/or framework 410. Configuration setting 428 can include, but is not limited, bridge 422 settings, data handling 424 options, engine 426 parameters, and the like. Setting 422 can be manually and/or automatically established. In one embodiment, setting 428 can be presented (e.g., configured) within a user interface associated with a client device. Setting 428 can include deployment environment settings, settings, and the like.

Access/licensing component 430 can be a software element permitting access and/or license control. Component 430 functionality can include, but is not limited to, authentication, authorization, auditing, licensing permissions, and the like. In one instance, the component 430 can communicate with authentication/login services (e.g., directory services) to enable user specific permissions. Component 330 can support proprietary and open licensing policies. That is, component can enable multiple licensing types to be supported.

Update component 432 can be a software component for managing environment 420 and/or custom components 434. Component 432 functionality can include, but is not limited to, environment 420 updates, components 434 updates, compatibility checking, and the like. Component 432 can be utilized to detect and/or install environment 420 within a client device. For example, component 432 can be utilized to detect plug-in (or expeditor infrastructure components) presence and perform necessary updates. In one instance, component 432 can be associated with an IBM Service Management Framework.

Custom component 434 can be a software element for performing custom built functionality associated with an MVC application. Component 434 functionality can include, but is not limited to, data conversion, data manipulation, visualization customization, and the like. In one embodiment, component 434 can be developed and deployed within a server. In the embodiment, component 434 functionality can be dynamically received by a client device.

Figure 5:
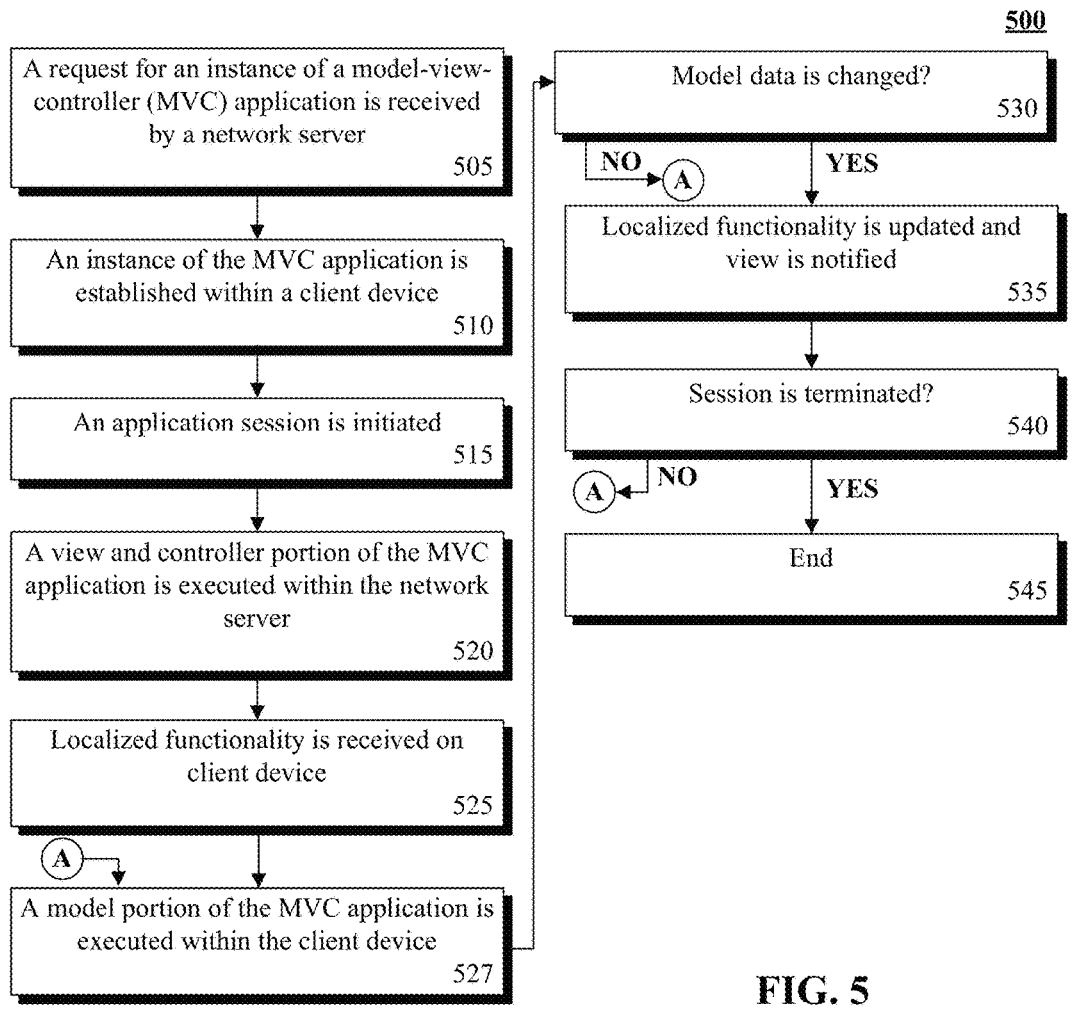
FIG. 5 is a flowchart a method for isolating end-user data within a local domain in accordance with an embodiment of the inventive arrangements disclosed herein.

FIG. 5 is a flowchart a method 500 for isolating end-user data within a local domain in accordance with an embodiment of the inventive arrangements disclosed herein. Method 500 can be performed in the context of system 200 and/or framework 410. In method 500, an instance of a model-view-controller application can be established within a client device. The functionality of the instance can be received upon the client device. The functionality can permit user data to be processed within client device without requiring the user data to be uploaded to a networked server. That is, view and controller functions of a Web application (e.g., a MVC application) can be performed by one or more network servers functioning within a Web domain. Model functions of the Web application can be performed by one or more devices (such as the client device) functioning within the local domain. End user data can remain isolated in storage devices of the local domain.

In step 505, a request for an instance of a Web or MVC application is received by a network server (e.g., a Web server). In step 510, an instance of the Web application can be established within a client device. For example, a client device executing a JAVA micro edition (JME) runtime environment can request an application instance of an audio editor application. In step 515, an application session can be initiated. In step 520, a view and controller portion of the Web application can be executed within the network server. In step 525, localized functionality of the Web application can be received upon the client device. In step 527, a model portion of the Web application can be executed within the client device. For example, an expeditor linked to a web browser via a JAVASCRIPT bridge can handle the model functions. One or more components of the We application (e.g., components 310, 312) can run within a client-side expeditor runtime component.

In step 530, if the model data has changed, the method can continue to step 535, else return to step 527. In step 535, the localized functionality can be updated and the view component can be notified. The view component can be refreshed without requiring model data to be communicated to the network server. In step 540, if the session is terminated, the method can continue to step 545, else return to step 527.

As used herein, the client 220 can be a hardware/software entity. That is, the client 220 can be a computing device that includes a processor, a non-volatile memory, a volatile memory, a network interface card, input/output peripherals, a bus connecting the components, and the like. The client 220 can include, but is not limited to, a desktop computer, a laptop computer, a tablet computing device, a personal digital assistant (PDA), a mobile phone, a home internet appliance, and the like. The hardware of client 220 can execute software/firmware stored on a storage device. The software/firmware can include, but is not limited to, operating system, a user interface, and the like. Software of device 220 can optionally include the expeditor runtime 252.

The user interface software of client 220 can include the browser 222. In one embodiment, browser 222 can be a Web browser can include, but is not limited to, MOZILLA FIREFOX, APPLE SAFARI, GOOGLE CHROME, and the like. The Web browser 222 can also include a rich internet application, a web-enabled widget, and the like.

End-user data 215 can include, but is not limited to, binary data, non-binary file, text file, media files, and the like. End-user data 215 can include any data consumed by a model portion of a model-view-controller architecture. In one embodiment, end-user data 215 can originate from one or more sources including, but not limited to, a directory structure, a database, and the like. End-user data 215 may be associated with security mechanisms, including, but not limited to, encryption, access control mechanisms, and the like.

Web server 210 can be a hardware/software entity for hosting Web application 211 (also referred to as MVC application in portions of the disclosure). In one instance, server 210 can be associated with an IBM WEBSPHERE APPLICATION SERVER or another JAVA2 ENTERPRISE EDITION (J2EE) based application. In the instance, server 360 can be an IBM LOTUS EXPEDITOR SERVER.

Web application 211 can be an executable program code running within a networked environment. Thus, the Web application 211 can include, but is not limited to, a true Web application, a Web-based service, a SaaS service, a SaaS program, a MVC application, and the like. Further, application 211 can include, but is not limited to, a word processor, a spreadsheet program, a slide-show presentation application, and the like. In one embodiment, application 211 can be a JAVA 2 ENTERPRISE EDITION (J2EE) application. Application 211 can include, but is not limited to, a JAVA servlet, JAVA applet, and the like. Application 211 can present content including, but not limited to, Hypertext Markup Language (HTML), Extensible HTML (XHTML), and the like.

The network connecting Web server 210 and client 220 (connecting web domain 204 and local domain 206) can be an electrical and/or computer network connecting one or more system components. The network can include, but is not limited to, twisted pair cabling, optical fiber, coaxial cable, and the like. Additionally, the network can include any combination of wired and/or wireless components. The network types for the network can include, but are not limited to, Local Area Network (LAN), Wide Area Network (WAN), Virtual Private Network (VPN), and the like. The network can include, but is not limited to, an intranet, an internet, an extranet, a personal area network, a metropolitan area network, and the like.

A domain (e.g., Web domain 204 and local domain 206) contains a group of computers that can be accessed and administered with a common set of rules. Domains 204, 206 are isolated from each other and are separately administered. Control and/or administration of these rules and the computing resources for each domain 204, 206 are independent of the other. That is, administrators of the Web domain 204 lack an ability to change rules established for the local domain 206. One of these rules is that end-user data (e.g., 217) is to remain isolated from the Web domain 204. Similarly, the Web domain 204 is able to maintain, administer, and establish rules and procedures for the Web application 211. No local administrator is able to change Web domain 204 specifics, in absence of a Web administrator explicitly granting privileges, which can also be revoked. Similarly, rules for accessing local data 217 can be managed/revoked by the local administrator. Thus, local administrators incur little overhead for the Web application 211 while maintaining control and privacy of end-user data 217.

The flowchart and block diagrams in the FIGS. 2-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing a model-view-controller (MVC) Web application comprising:
    establishing a session for the MVC Web application between a Web server of a Web domain and a browser of a client of a local domain, wherein the MVC Web application is constructed so that view and controller functionality are provided by components executing in the Web domain and where model functionality is provided by components executing in the local domain;
    during the session, serving an expeditor runtime component from the Web domain to the local domain for the MVC Web application session which provides the model functions for the MVC Web application, wherein a running instance of the expeditor runtime component is referred to as the expeditor runtime and wherein the expeditor runtime is an extension to the browser;
    during the session, serving at least one widget from the Web domain to the local domain, wherein the widget is downloaded from the Web server of the Web domain, and wherein an instance of the expeditor runtime executes code of the widget for processing of the end-user data;
    wherein a bridge is configured to allow the remotely rendered MVC Web application to access local resources of the local domain without exposing end-user data of the local domain to the Web domain; and
    conducting the session, wherein model functions of the expeditor runtime running in the local domain handle processing of the end-user data.

2. The method of claim 1, wherein the expeditor runtime is an extension of the browser.

3. The method of claim 1, wherein the expeditor runtime is a client-side component that is compliant with an OSGi standard for dynamic components.

4. The method of claim 1, wherein the expeditor runtime component is dynamically deployed, installed, and run without rebooting software of the client, wherein user interface functionality for user interfaces rendered within the browser is provided by the Web server, and wherein control of the Web application is maintained by the Web server.

5. The method of claim 1, wherein the expeditor runtime and the at least one widget are not persisted in the local domain beyond the session.

6. The method of claim 1, wherein one of the served widgets that executes in the expeditor runtime provides access to files and other data of the local domain.

7. The method of claim 1, wherein one of the served widgets that executes in the expeditor runtime converts data from a default format in which the data is stored in the local domain to an extensible markup language (XML) format needed by the Web application.

8. A computer program product comprising:
    one or more computer-readable, tangible storage devices;
    program instructions, stored on at least one of the one or more storage devices, to establish a session for a model-view-controller (MVC) Web application between a Web server of a Web domain and a browser of a client of the a local domain, wherein the MVC Web application is constructed so that view and controller functionality are provided by components executing in the Web domain and where model functionality is provided by components executing in the local domain;
    program instructions, stored on at least one of the one or more storage devices, to, during the session, serving an expeditor runtime component from the Web domain to the local domain for the MVC Web application session, which provides the model functions for the MVC Web application, wherein a running instance of the expeditor runtime component is referred to as the expeditor runtime, wherein the expeditor runtime is dynamically deployed, installed, and run without rebooting software of the client, and wherein the expeditor runtime is an extension of the browser;
    program instructions, stored on at least one of the one or more storage devices, to, during the session, serving at least one widget from the Web domain to the local domain, wherein the widget is downloaded from the Web server of the Web domain, and wherein an instance of the expeditor runtime executes code of the widget for processing of the end-user data;
    program instructions, stored on at least one of the one or more storage devices, to control a bridge, wherein the bridge is configured to allow the remotely rendered MVC Web application to access local resources of the local domain without exposing end-user data of the local domain to the Web domain; and
    program instructions, stored on at least one of the one or more storage devices, to conduct the session, wherein user interface functionality for user interfaces rendered within the browser is provided by the Web server, wherein control of the MVC Web application is maintained by the Web server, and wherein model functions of the expeditor runtime running in the local domain handle processing of the end-user data.

* * * * *